June 26, 1923.

P. FAIVRE

SPRING WHEEL

Filed Jan. 8, 1923

1,460,318

Inventor
P. Faivre
By Langner, Perry, Card & Langner
Attys.

Patented June 26, 1923.

1,460,318

UNITED STATES PATENT OFFICE.

PIERRE FAIVRE, OF LE LOCLE, SWITZERLAND.

SPRING WHEEL.

Application filed January 8, 1923. Serial No. 611,524.

*To all whom it may concern:*

Be it known that I, PIERRE FAIVRE, a citizen of the Swiss Republic, and resident of Le Locle, Switzerland, have invented new and useful Improvements in Spring Wheels, of which the following is a full, clear, and exact specification.

This invention relates to a spring wheel of the kind in which power transmission levers are interposed between the wheel felly and the axle body. The principle of the invention differs from known constructions of this type in that the power transmission levers in the form of rocking levers mounted on the axle body and connected by links to the felly, are arranged to rest like riders on an eleastic supporting rim closed in itself, extending along the wheel circumference and composed, for instance, of coiled springs joined together, so as to bear on said elastic rim by pressure transverse to the length thereof. This construction of the wheel gives a more compact arrangement as well as better and more advantageous springing, than it would be possible with ordinary compression or tension springs. The elastic rim fatigue is a less important one, although an excellent absorption of shocks from impediments is obtained. The whole construction is strong and of the greatest simplicity.

The drawing illustrates a method of carrying the invention into practice.

The wheel consists of the axle body A and the felly B with an annular space C between them, allowing a reciprocating radial displacement. The parts A and B are attached to each other by a series of rocking levers D, which are arranged at equal distances along the wheel rim. The rocking levers D are pivotally attached at $d$ to the sides of the axle body A and are coupled to the felly B by small links $e$. They are bent at an angle and their ends bear like riders against an elastic supporting rim F. The rim F consists of, for example, two ring-shaped groups of coil springs attached together, which are hung on pins $f$ on the axle body A. Whilst here the coil springs of every group are made of a single spring wire, they can of course be separate from each other and coupled together by links or the like, in which case the substitution of the several parts is simpler. Also the spring rim can be made of solid or hollow rubber or made elastic in some other way as long as it is closed in itself and extends like the rocking levers along the wheel circumference.

Figure 1:
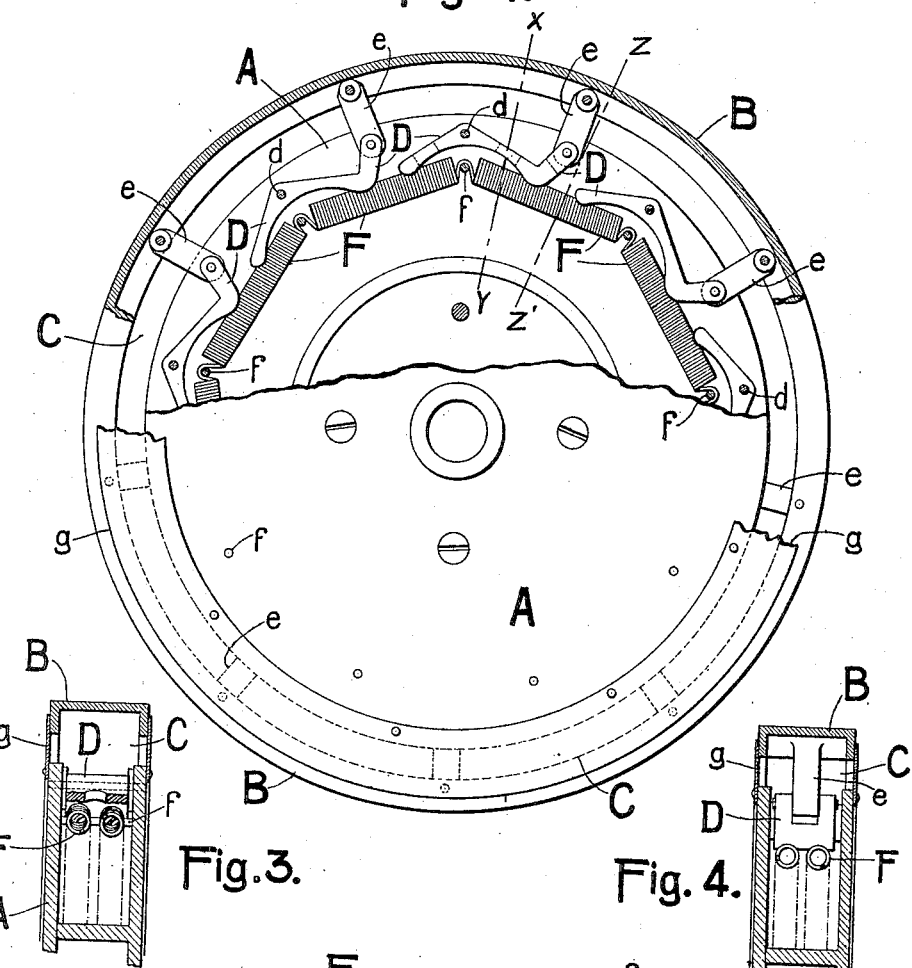
Fig. 1 is a side view of the same, partly in section.
Figure 3:
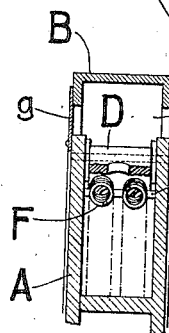
Figs. 3 and 4 are cross-sections through the lines X—Y and Z—Z' of Fig. 1.
Figure 4:
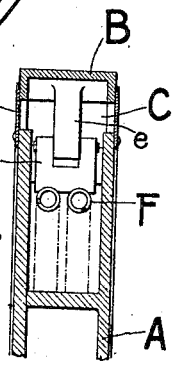
Figure 2:
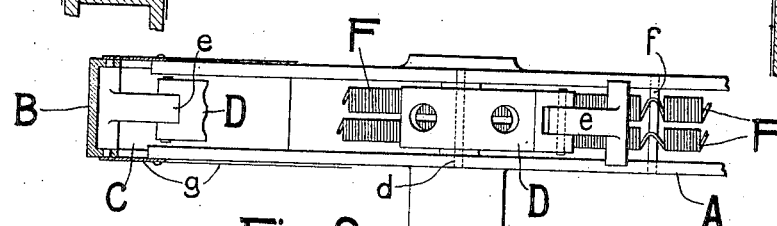
Fig. 2 is a view of the wheel circumference with the felly in section.

When loaded the axle body A endeavours to sink in respect of the felly B resting on the ground (Fig. 1). The consequence is that the rocking levers D swing on their pins $d$ and by working together they transmit the weight to the elastic supporting rim F in a direction transverse to that of the circumference. The wheel can thus yield radially as well as circumferentially.

The space between the axle body and the felly is closed laterally by closing rings $g$, which are fastened to the former and prevent the entry of dust and dirt etc. Naturally this can be some sort of flexible closure, for instance a leather, rubber closure or the like.

As already mentioned, the elastic or spring supporting rim can be constructed in various ways. Thus, for instance, a construction is possible where the spring supporting rim is composed of two groups of coil springs lying concentrically one inside the other. Also the rocking levers can be made pairwise and in each pair arranged a different distance from the wheel axis. Furthermore the points or bearing of the levers on to the elastic supporting rim may lie elsewhere.

What I claim is:—

1. A spring wheel, comprising an axle body element, a felly element independent from said axle body element, power transmission rocking levers adapted to yieldingly interconnect said two elements, an elastic supporting rim along the wheel circumference and carrying means therefor, said rocking levers being arranged with respect to said eleastic supporting rim so as to bear thereon like riders transversely to its length.

2. A spring wheel, comprising an axle body element, a felly element independent from said axle body element, power transmission rocking levers adapted to yieldingly interconnect said two elements, an elastic supporting rim formed of coil springs, connected with one another to a closed whole, along the circumference of the wheel, and carrying means for said supporting rim, said rocking levers being arranged with respect to said coil springs so as to bear thereon like riders transversely to their length.

3. A spring wheel, comprising an axle body, a felly independent from said axle body, power transmission rocking levers pivoted to said axle body and linked to said felly, an elastic supporting rim along the wheel circumference and carrying means therefor, said rocking levers being arranged with respect to said elastic supporting rim so as to bear thereon like riders transversely to its length.

In witness whereof I have hereunto signed my name this 22nd day of December 1922, in the presence of two subscribing witnesses.

PIERRE FAIVRE.

Witnesses:
 MADELEINE CHAPMAN,
 MURIEL RAILT.